United States Patent (10) Patent No.: US 6,843,632 B1
Hollander                                      (45) Date of Patent:     Jan. 18, 2005

(54) OUT-PROCESSING FACILITY FOR INDIVIDUAL GOODS

(75) Inventor: Rudolf Hollander, Vorden (NL)

(73) Assignee: Dynamic Systems Engineering B.V. (NL)

( * ) Notice: Subject to any disclaimer, the term of this patent is extended or adjusted under 35 U.S.C. 154(b) by 0 days.

(21) Appl. No.: 10/130,634

(22) PCT Filed: May 26, 2000

(86) PCT No.: PCT/EP00/04801

§ 371 (c)(1),
(2), (4) Date: Aug. 23, 2002

(87) PCT Pub. No.: WO01/36302

PCT Pub. Date: May 25, 2001

(30) Foreign Application Priority Data

Nov. 17, 1999 (EP) ............................. PCT/EP99/08823
Apr. 27, 2000 (DE) ................................... 100 20 608

(51) Int. Cl.$^7$ .............................................. B65G 1/16
(52) U.S. Cl. ................................... 414/276; 198/347.4
(58) Field of Search ........................... 414/268, 276, 414/273, 278; 198/347.1, 347.4, 570

(56) References Cited

U.S. PATENT DOCUMENTS

| 3,122,231 | A | * | 2/1964 | Pence et al. ............. | 198/347.4 |
| 3,153,487 | A | * | 10/1964 | Hoellen .................... | 198/347.4 |
| 3,173,557 | A | * | 3/1965 | Gunnar .................... | 198/347.4 |
| 3,265,186 | A | * | 8/1966 | Burton ........................ | 198/361 |
| 3,455,447 | A | * | 7/1969 | Bucher ........................ | 209/692 |
| 3,458,026 | A | | 7/1969 | Lauzon | |
| 3,567,010 | A | | 3/1971 | Vom Stein | |
| 3,840,109 | A | | 10/1974 | Kohl | |
| 3,933,237 | A | | 1/1976 | Rotterman | |
| 4,266,659 | A | | 5/1981 | Meyer et al. | |
| 4,835,702 | A | | 5/1989 | Tanaka | |
| 4,915,566 | A | | 4/1990 | van Elten | |
| 5,040,669 | A | | 8/1991 | Blöcker | |
| 6,186,724 | B1 | * | 2/2001 | Hollander .................. | 414/276 |

FOREIGN PATENT DOCUMENTS

| CH | 432 366 | 9/1967 |
| DE | 756 902 | 7/1949 |
| DE | 1 904 486 | 9/1963 |
| DE | 1 925 556 | 4/1971 |
| DE | 2 227 645 | 12/1973 |
| DE | 27 02 724 | 9/1977 |
| DE | 3504365 | 10/1986 |
| DE | 3215744 | 3/1989 |
| DE | 295 19 805 | 3/1996 |
| DE | 4419416 | 5/1997 |
| DE | 298 17 239 | 1/1999 |
| DE | 298 07 325 | 10/1999 |
| EP | 0264254 | 4/1988 |
| EP | 0803453 | 10/1997 |

OTHER PUBLICATIONS

Logistik Article Nr. 12/94 S.11 Bild.
Article/Advertisement—Transnorm Systems.

* cited by examiner

Primary Examiner—Eileen D. Lillis
Assistant Examiner—Charles A. Fox
(74) Attorney, Agent, or Firm—R W Becker & Associates; R W Becker

(57) ABSTRACT

A picking store for piece goods is disclosed, which comprises a storage area (1), with a number of storage racks (7), for the goods to be picked, arranged parallel to each other, whereby only goods of the same type are found in each rack, a placing area (2), at one end of the storage racks (7), with a means for depositing new goods in the appropriate storage rack (7) and a picking area at the other end of the storage racks (7) with a withdrawing device (4) for computer controlled transfer of individual items from the storage racks to the serial conveyor. Each storage rack comprises a roller conveyor (8), whose rollers or cylinders may be set in rotation by a common drive system (16) and each storage rack (7) has its own, independently operable withdrawing device (4). The drive system (16) for the roller conveyer is preferably a drive belt.

22 Claims, 12 Drawing Sheets

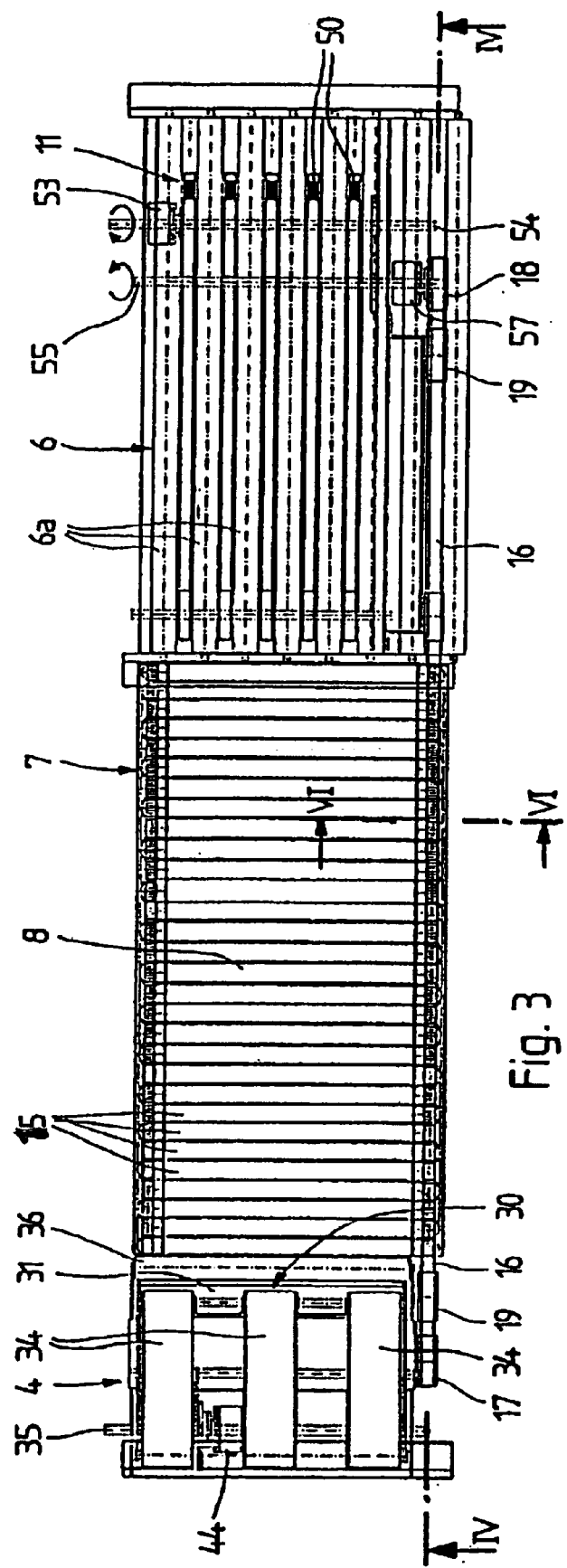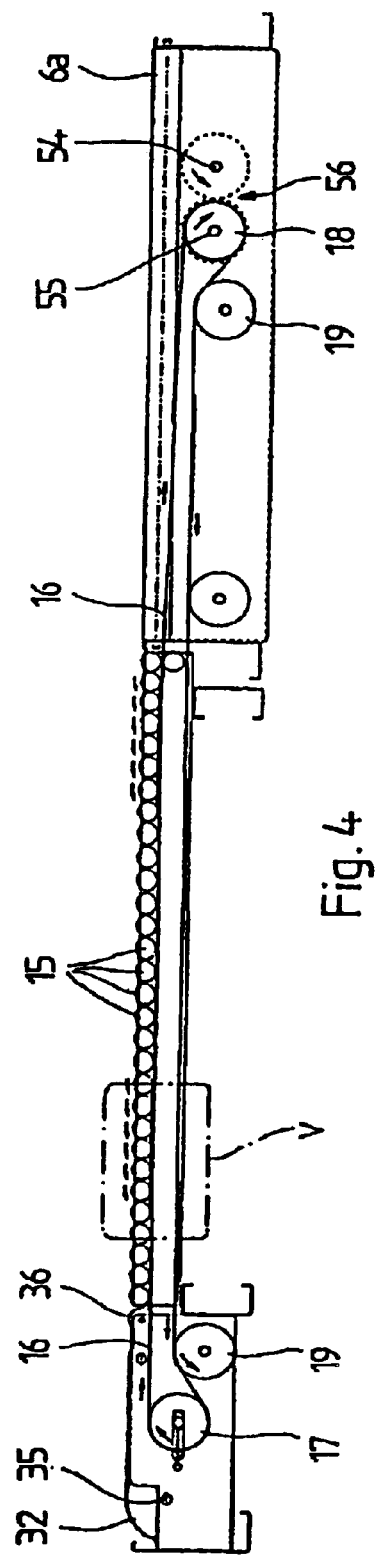

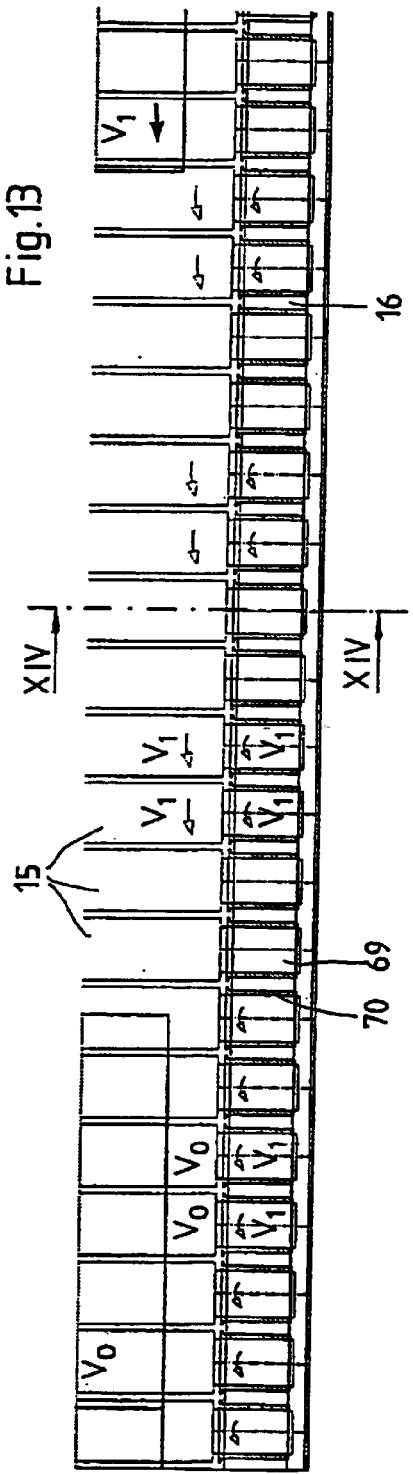
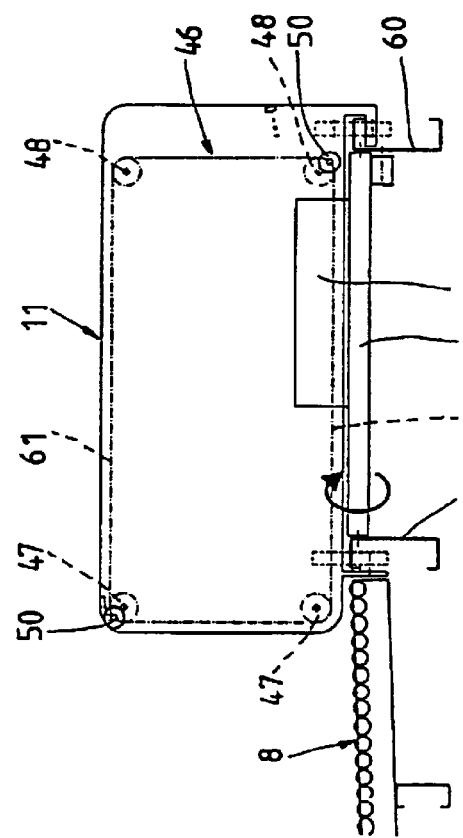
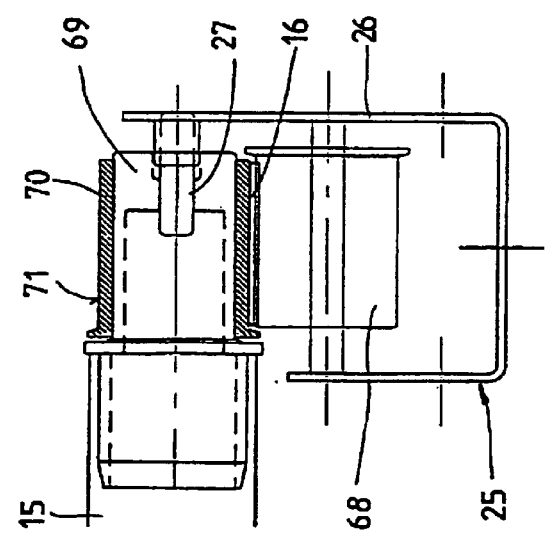

OUT-PROCESSING FACILITY FOR INDIVIDUAL GOODS

BACKGROUND OF THE INVENTION

The invention relates to an out-processing facility for individual or piece goods, comprising:

a storage area having a plurality of storage passages, for items to be out-processed, extending parallel to one another therein, a loading area at one end of the storage passages with means for in-loading new items into the storage passages, and, an out-processing area at the other end of the storage passages with removal apparatus for computer-controlled transfer of individual items out of the storage passages onto downstream conveyor devices.

Warehouse order-processing technology is gaining importance in all fields of commerce and in particular in the wholesale foods industry. However, warehousing in its narrower sense (i.e., static storage of individual goods) is becoming less significant while the dynamic processes and especially turn-around handling of goods is gaining importance. The goal of modern warehousing is therefore to keep the retention time of the individual goods in the warehouse to a minimum and thus to keep to a minimum the amount of capital tied up in warehousing.

Known out-processing facilities are multi-story racks that constitute storage passages for the individual goods and that are arranged adjacent to and above one another. The floors of the passages are provided with roller conveyors made of freely rotatable rollers and are slightly inclined so that goods warehoused at one end of the passage, the so-called stocking or loading side, move along the roller conveyors to the other end of the passage, the removal or order-processing side. Placing the individual goods into position on the stocking side is generally done manually in that the individual goods are removed from a pallet and placed into the assigned passage. Order-processing at the removal side of the racks is also frequently performed manually, although out-processing facilities having mechanically operating, separately controllable removable devices are also already known from U.S. Pat. Nos. 4,915,566 and 4,527,937.

Furthermore known are computer-controlled drivable removal devices in the form of conveyor devices that can be driven in a passage arranged on the order-processing side of the rack and that, corresponding to the order, take the individual goods maintained in-stock in the individual passages and assemble the order. The conveyor devices used for this can be driven over corresponding guides in two coordinates so that each conveyor device can access individually each of the passages arranged adjacent to and above one another.

The object of the invention is to provide an out-processing facility with which high turn-around rates can be achieved and which is also suitable for simultaneous processing of goods that are very different in terms of weight and size.

SUMMARY OF THE INVENTION

For achieving this object, in an out-processing facility of the type described in the foregoing it is suggested that every passage comprises one roller conveyor, the rollers or cylinders of which can be rotated via a common drive means, in that each passage is provided with a discrete removal apparatus that is actuatable independently of the other removal apparatus and that has as a component a horizontal conveyor, and that the horizontal conveyor of a plurality of the storage passages can be driven via a common drive shaft as soon as an item is to be removed out of one of these storage passages via the pertaining removal apparatus.

Such an out-processing facility makes it possible to achieve a high turnaround rate because each individual passage is provided with a discrete removal apparatus that is actuatable independently of the other removal apparatus in the out-processing facility. The items can even also be very different individual goods in terms of their weight and size. The use of a roller conveyor for each passage, the rollers or cylinders of which can be set in motion via a common drive means, ensures that light and heavy, large and small individual goods and containers are transported and stocked in the passages with the same degree of assurance. Even individual goods that are critical in conventional warehouse engineering, such as, for instance, full plastic crates of beverages, can be processed with no problem using the driven roller conveyor. Since the horizontal conveyors of a plurality of the removable apparatus can be driven via a drive shaft that is common for these removal apparatus, as soon as an item is to be removed out of one of the pertaining storage passages, the total number of drives required in the form of, for example, electric motors can be reduced, and the out-processing facility can be more economically produced.

In accordance with one preferred embodiment of the out-processing facility, the common drive means is a continuous drive belt. For achieving limited drive slip while maintaining a cost-effective design of the roller conveyor, the drive belt can be guided between the rollers or cylinders and a pressure support. Counter-pressure rollers are preferred for the pressure support.

For achieving sufficient constructive freedom in the design of the drive and reversing devices for the drive means for the roller conveyor it is furthermore suggested that the drive belt that acts as drive means is reversed via reversing rollers that are disposed in or under the loading area and/or the out-processing area.

In accordance with one preferred embodiment, for the rollers or cylinders of the out-processing facility it is provided that the drive belt drives an element that is preferably embodied as a sleeve and that is rotatably borne on the roller or cylinder. In this manner intentional but also only limited friction is achieved between the freely rotatable sleeve and the roller or cylinder. This leads to the cylinder being driven very "softly" with only limited driving torque, in contrast to which when this driving torque increases the striking surfaces spin between sleeve and pin, so that no significant driving torque is transferred from the sleeve to the cylinder any longer. It is advantageous when the coefficient of friction between roller or cylinder and the element is less than the coefficient of friction between the element and the drive belt. The "soft" drive of the cylinders achieved in this manner leads to a reduction in the conveyor pressure in the roller conveyor so that above all only a small amount of pressure is exerted on the individual goods arranged at the first position on the removal side end of the storage passage. It is furthermore advantageous that the removal apparatus for the out-processing area can also be operated with lower drive power due to the limited dynamic pressure of the items.

Preferably the reversing roller arranged below the out-processing area is driven by the reversing rollers via which the drive belt is guided. In this manner the roller conveyor can be driven via the same main drive that drives the removal apparatus. The total number of drives required, in the form of electromotors, for instance, can thus be reduced in this manner, and the out-processing facility can be produced more cost-effectively. In addition, it is suggested that the motion for the drive means for the roller conveyor comes from the rotational motion of the common drive shaft.

It has proved particularly advantageous during out-processing of containers of groceries that are in part very different in weight and size for the roller conveyors to be inclined in the direction toward the removal apparatus. The individual goods on the roller conveyors are thus transported using two different mechanisms, these being gravity as a result of the inclined roller conveyor and the motor drive of the rollers or cylinders by means of the common drive means. This simultaneous dual mechanism leads to excellent uniformity in the transport speed for the individual goods, regardless of their weight or size. Beverage cases that have a relatively high specific weight are transported along the roller conveyor just as rapidly as particularly light containers such as cartons of potato chips or packages of toilet paper. An angle of incline for the roller conveyor of 2.5 to 6%, preferably 3 to 5.5%, has proved particularly suitable for achieving this averaging effect.

One preferred embodiment of the out-processing facility is characterized in that a transport conveyor that is preferably continuously driven extends along the removal apparatus and transverse to the passages for the items removed using the removal apparatus, and in that a component of each removal apparatus in addition to the horizontal conveyor is an actuatable retaining element projecting into the conveyor path of the roller conveyor, whereby the conveying speed of the horizontal conveyor is greater than the conveying speed of the roller conveyor. Preferably the conveyor speed of the horizontal conveyor is at least 25% greater than the conveyor speed of the roller conveyor. This achieves assured and problem free separation of the first items to be removed from the items arranged thereafter being conveyed via the roller conveyor.

Furthermore suggested is a controlled switchable coupling for periodically using the rotational motion of the common drive shaft to actuate an unblocking motion by the retaining element that releases the conveyor path, whereby the coupling of each removal apparatus can be controlled separately from the other couplings. In contrast to the unblocking motion, it is not necessary to use the present motor drives for the subsequent re-blocking motion of the retaining element. On the contrary, it is sufficient when the retaining element is provided with restoring means that act upon the retaining element with a restoring force in the direction of its blocking motion, whereby the restoring force is less than the weight of the items/goods containers stored in the passage. This restoring force can be produced for instance by the weight or the force of a suitable restoring spring.

The coupling preferably annularly encloses the common drive shaft, and the output member of the coupling is a cam that pivots against the retaining element when the coupling is actuated.

With the goal of a compact design for the out-processing area, it is suggested that the horizontal conveyor constitutes a driven first belt pulley, at least one additional belt pulley that runs therewith, and a continuous belt guided via the belt pulleys, whereby the driven belt pulley defines the forward end and the belt pulley that runs therewith defines the rear end of the horizontal conveyor.

In order to keep the number of electrical drives as low as possible, in another embodiment it is suggested that the first belt pulley is seated on a drive shaft, and that the drive shaft is in a continuous rotational connection via an interposed gear with the main drive shaft that drives a plurality of roller conveyors. In this way, the drive of the horizontal conveyor can be derived from the movement of the main drive shaft, thereby eliminating separate drive sources.

One embodiment of the loading area of the inventive out-processing facility is characterized by a transport conveyor in the loading area that extends transverse to the passages for new items to be in-loaded, as well as by a transverse conveyor in the loading area.

In a first embodiment, separately actuatable transverse conveyors, the conveyor direction of which is toward each passage, can be arranged between the transport cylinders of every passage. Th us, in this embodiment each passage is provided with a discrete transverse conveyor in the area of the transport conveyor.

In contrast, a second embodiment is characterized by a transverse conveyor that is common for a plurality of passages and that can be adjusted along the transport conveyor in a position in front of each of the passages. This solution involves lower costs, but requires that the transverse conveyor be able to move in the longitudinal direction along the transport conveyor.

In one preferred embodiment of the transverse conveyor, it is proposed that it be provided with belt pulleys via which a continuous drive belt or a drive chain is guided, and that two pick-up elements for the items are arranged on the drive belt or drive chain.

BRIEF DESCRIPTION OF THE DRAWINGS

The following explains inventive out-processing facilities using exemplary embodiments and with reference to the drawings. FIGS. 1 through 8 illustrate a first exemplary embodiment of an out-processing facility, FIGS. 9 through 17 illustrate a second exemplary embodiment of an out-processing facility. Specifically, in the drawings:

FIG. 1 is a perspective illustration of a section of an out-processing facility constituting a loading area, a storage area, and an order-processing area;

FIG. 2 is an enlarged top view of a part of the out-processing facility, whereby for reasons of simplification the storage area is shown much abbreviated;

FIG. 3 is a detailed drawing of a passage corresponding to approximately to FIG. 2 with associated loading area and an associated removal apparatus;

FIG. 4 is a cross-section along line IV—IV in FIG. 3;

FIG. 5 is an enlargement of detail V in FIG. 4;

FIG. 6 is a partial cross-section along line VI—VI in FIG. 3;

FIG. 7 illustrates details of the removal of items on the out-processing side of the out-processing facility in six steps; and, FIG. 8 illustrates details of loading the passage in the loading area of the out-processing facility in six steps.

FIG. 9 is a perspective illustration of a section of an out-processing facility constituting a loading area, a storage area, and an order-processing area;

FIG. 10 is an enlarged top view of a part of the out-processing facility, whereby for reasons of simplification the storage area is shown much abbreviated;

FIG. 11 is a side view of one storage passage of the out-processing facility;

FIG. 12 is an enlargement and partial side view of the storage passage in accordance with FIG. 11;

FIG. 13 is a top view of a side area of the storage passage in accordance with FIG. 12;

FIG. 14 is a cross-section along line XIV—XIV in FIG. 13;

FIG. 15 illustrates details of the removal of items on the out-processing side of the out-processing facility in six steps;

DESCRIPTION OF PREFERRED EMBODIMENTS

Figure 1:
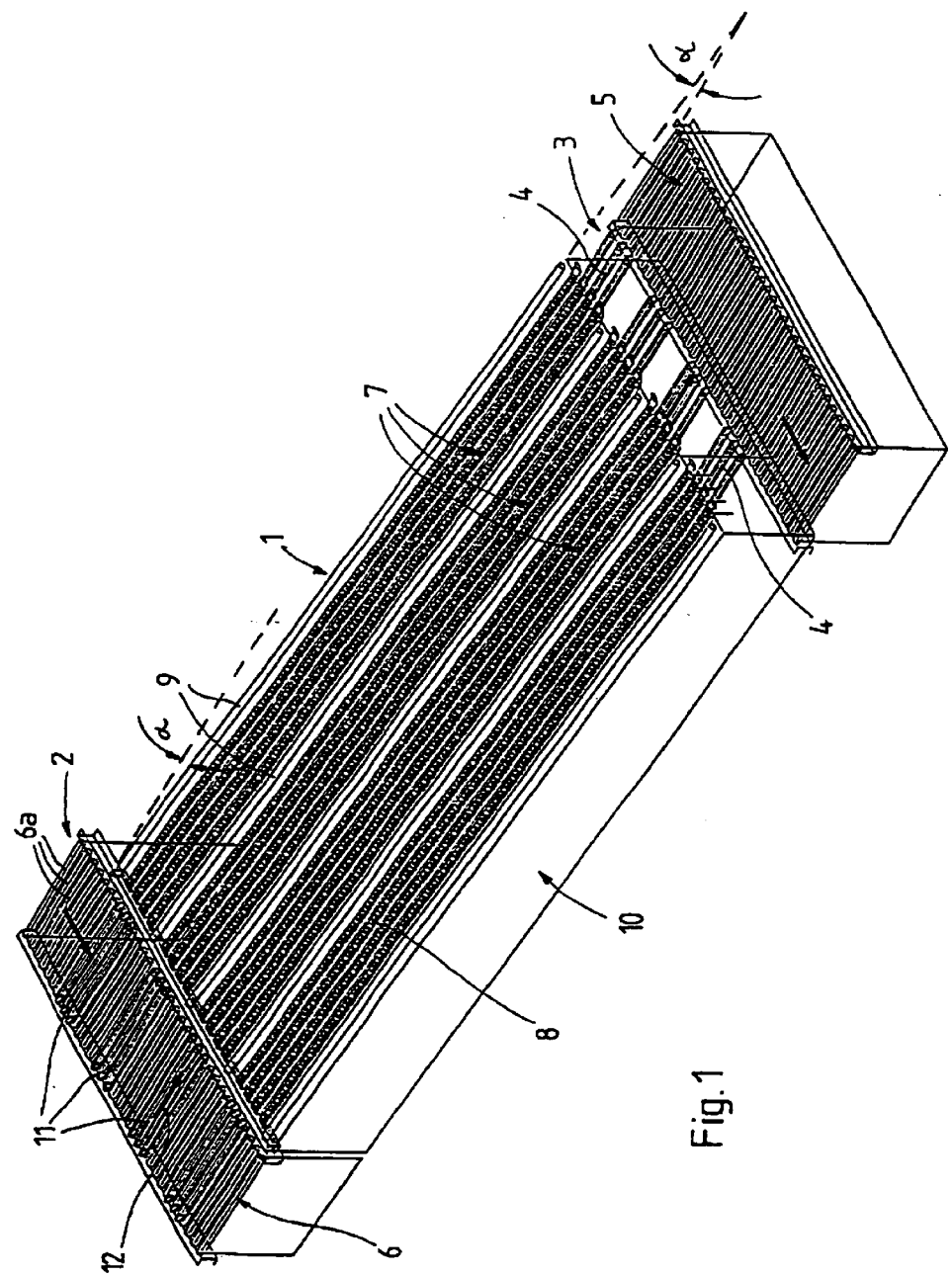

The out-processing facility for individual goods, including full cases of beverages and boxes of grocery items that have a very high turn-around rate in commercial trade, essentially comprises a storage area 1, a loading area 2 upstream of the storage area 1, and an out-processing area 3 downstream of the storage area 1. New individual goods that are to be in-loaded are in-loaded in the loading area 2 into the correct storage site within the storage area 1. In the out-processing area 3, the individual goods corresponding to the order are removed, computer-controlled, from the storage area 1 and conveyed to a location at which the orders are then assembled and if needed packed in larger packages. Provided for removing the individual items from the storage area 1 are removal apparatus 4 that place the items removed individually from the storage area 1 onto a downstream transport conveyor 5 along which the items are then further transported.

The items are also supplied to the loading area 2 by means of a continuously-driven transport conveyor 6, which, like the transport conveyor 5 of the out-processing area 3, can constitute a plurality of driven transport cylinders 6a upon which the transported individual goods roll.

The storage area 1 constitutes a plurality of storage passages 7 that are arranged parallel to one another. The passages 7 are slightly inclined in the direction of the removal apparatus 4 and comprise roller conveyors 8 made of rollers or cylinders that are borne in profiles on either side. Limits 9 separate the individual passages 7 from one another so that goods cannot inadvertently travel into adjacent passages. In the framework of the embodiments explained in more detail in the following, the function of the limits 9, that is, lateral guidance of the goods, can also be realized by flanges on the rollers or cylinders.

Only items or goods of the same type are located in each passage 7 in the out-processing facility. It is therefore possible to store four different types of items in the storage area 1 illustrated in FIG. 1, which comprises a total of four passages. Items of the same type are arranged one behind the other in each passage 7, whereby they move up to the end of the passage 7 facing the out-processing area 3 as a result of the drive of the roller conveyor, described in greater detail in the following, and the forward-most item is held there at a retaining element. Conveying the items along the roller conveyors 8 is furthermore enhanced by gravity due to the incline of the roller conveyors at the angle labeled α in FIG. 1.

The total of four passages 7 illustrated in FIG. 1 together form one module 10. A plurality of such modules can be arranged adjacent to one another so that, depending on physical parameters, up to 100 passages can be arranged adjacent to one another and with common devices of the loading area 2 and the out-processing area 3. In addition, the illustrated out-processing area can be arranged in several layers in order to increase space utilizaton.

The transport conveyor 6 is common to all passages 7, which is why even items of different types can be conveyed using the transport conveyor 6. In order to categorize each of these items into the correct passage 7, a discrete transverse conveyor 11 with a direction of conveyance 12 in the direction of the passage is arranged in front of each passage. Each transverse conveyor 11 is controlled fully automatically depending on the group of items supplied via the transport conveyor 6. These can be identified, for instance, using a barcode located on the individual goods.

As an illustration of the principle, it cannot be seen from FIG. 1 that a second out-processing area can be disposed on the other side of the transport conveyor 6 that faces away from the passages 7 so that out-processing areas on both sides can be loaded via the transport conveyor 6. Naturally in this case the transverse conveyors 11 should be able to transport in both directions.

In the out-processing area 3, the items are removed individually from the passages 7 by means of the removal apparatus 4 and are transferred to the common transport conveyor 5, which extends transverse to the passages. Each individual passage 7 is allocated a discrete removal apparatus 4, which is why items can be removed from several passages 7 at once and transferred to the transport conveyor 5, which is designed to be wide enough for this purpose.

Details and the functioning of the roller conveyors 8 of the storage area are described in the following using FIGS. 2 through 6.

The cylinders 15 of each roller conveyor can be caused to rotate via a drive means that is common to all of the cylinders in the roller conveyor. This common drive means is a continuous drive belt 16 that is guided via reversing rollers 17, 18. The reversing roller 17 is located below the out-processing area 3, and the reversing roller 18 is located below the loading area 2 of the out-processing facility. Provided in addition are suitable tension rollers 19 that produce the tensioning pressure on the drive belt that is required for properly transporting the drive belt 16. This tension can also be produced directly via the reversing rollers 17 and 18, however.

Figure 5:
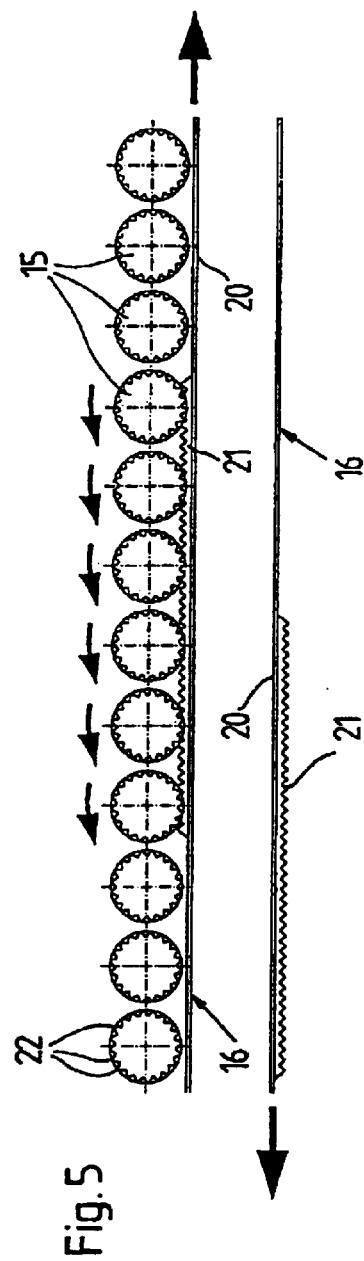
Figure 6:
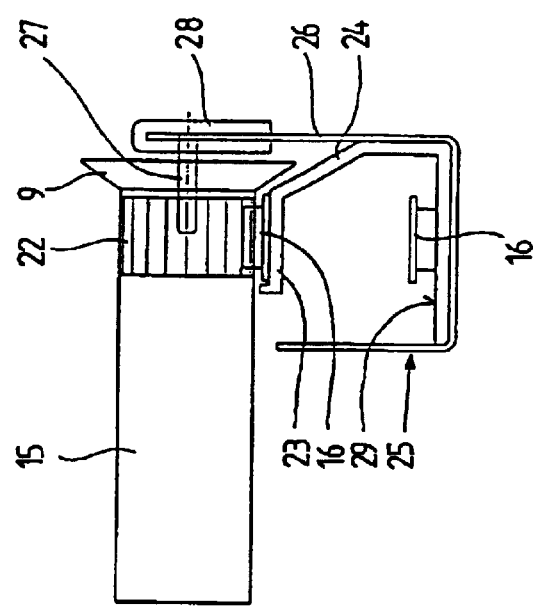

FIGS. 5 and 6 illustrate how the drive belt 16 effects the drive of the individual cylinders 15 in the roller conveyor. The drive belt 16 comprises a continuous base body 20 that remains the same thickness across its entire length, and drive segments 21 in the form of toothed bands affixed by segment to the base body 20. However, the drive segments 21 cover only a portion of the length of the drive belt 16 so that there are additional segments between each drive segment 21 that do not have any teeth. Both groups, that is, the segments of the drive belt 16 provided with the drive segments 21 and the segments of the drive belt 16 comprising only the base body 20, alternate, whereby the intervals between successive drive segments 21 are preferably the same.

The cylinders 15 at their ends are provided with opposing teeth 22 that engage with the teeth of the drive segments 21. In this manner a cylinder 15 is only driven if one of the drive segments 21 is directly beneath it. In contrast, a cylinder 15 is not driven if directly beneath it there is only the base body 20 of the drive belt 16.

To ensure that the drive belt 16 in the region of its drive segments 21 engages securely with the opposing teeth 22 in the cylinders 15, the resultant reaction force must be absorbed. A pressure support 23 is used for this; it extends across the entire length of the roller conveyor 8 in the form of a continuous surface. The carrying or upper run of the drive belt 16 is thus pulled between the pressure support 23 and the individual cylinders 15. The interval is designed such that the drive segments 21 of the drive belt 16 are pulled through this gap with no play so that the teeth and opposing teeth 22 truly engage. The pressure support 23 is formed by the flat top side of a profile 24 that is inserted in a roller conveyor profile 25. An exterior leg 26 of the roller conveyor profile 25 bears the individual rollers or cylinders 15. The rollers or cylinders 15 are provided with short axes 27 that are attached to the exterior leg 26 of the roller conveyor profile 25 via clips 28 that can be clipped on. The clips 28 make it possible to exchange individual cylinders for other cylinders rapidly and easily. During return transport, the bottom run of the drive belt 16 runs inside the roller conveyor profile 25, preferably on the smooth upper side 29 of the profile 24, as seen in FIG. 6.

Details and functioning of the removal apparatus 4 are explained in the following using FIG. 7.

Each removal apparatus 4 constitutes a horizontal conveyor 30 and a retaining element 31. The horizontal conveyor 30, the conveying level of which is the same as the conveying level of the roller conveyor 8, comprises two belt pulleys 32, 33 that guide a wide belt 34. Each horizontal conveyor 30 comprises a total of three of these belts 34. The belt pulley 32, which is farther away from the roller conveyor 8, is driven and is seated therefor directly on a drive shaft 35. The drive shaft 35 is continuously driven and simultaneously drives the horizontal conveyors 30 of a plurality of passages. All of the horizontal conveyors 30 therefore run continuously. In contrast to the belt pulley 32, the other belt pulley 33 of the horizontal conveyor 30 is not driven. The belt pulley 33 is located in the closest possible proximity to the roller conveyor 8. In the exemplary embodiment there is located between the belt pulley 33 and the closest cylinder 15 of the roller conveyor, a smaller, free-running roller 36.

Another component of the retaining element 31 of the removal apparatus 4 is furthermore a lever 37, at the end of which is located the blocking member of the retaining element. The lever 37 is borne on a horizontal axis 38. The retaining element 31 can be pivoted back and forth about the axis 38 between two positions. In the first position, illustrated at the top of FIG. 7, the blocking member of the retaining element 31 projects into the conveyance path for the items 39. In its other position, the retaining element 31 drops to the conveying level or below. The second and third stages illustrated in FIG. 7 show the retaining element 31 in this position.

Provided in order to move the retaining element 31 out of its blocking position into its unblocking position is a cam 40 that is borne on an axis that is coaxial with the drive shaft 35. The cam 40 has a surface 41 that runs along a roller 42, whereby the roller 42 is located on the lever 37. In the exemplary embodiment, the lever 37 is a two-armed lever, whereby the blocking member is located at the end of one arm of the blocking member, while the roller 42 is borne on the length of the other arm.

Figure 7:
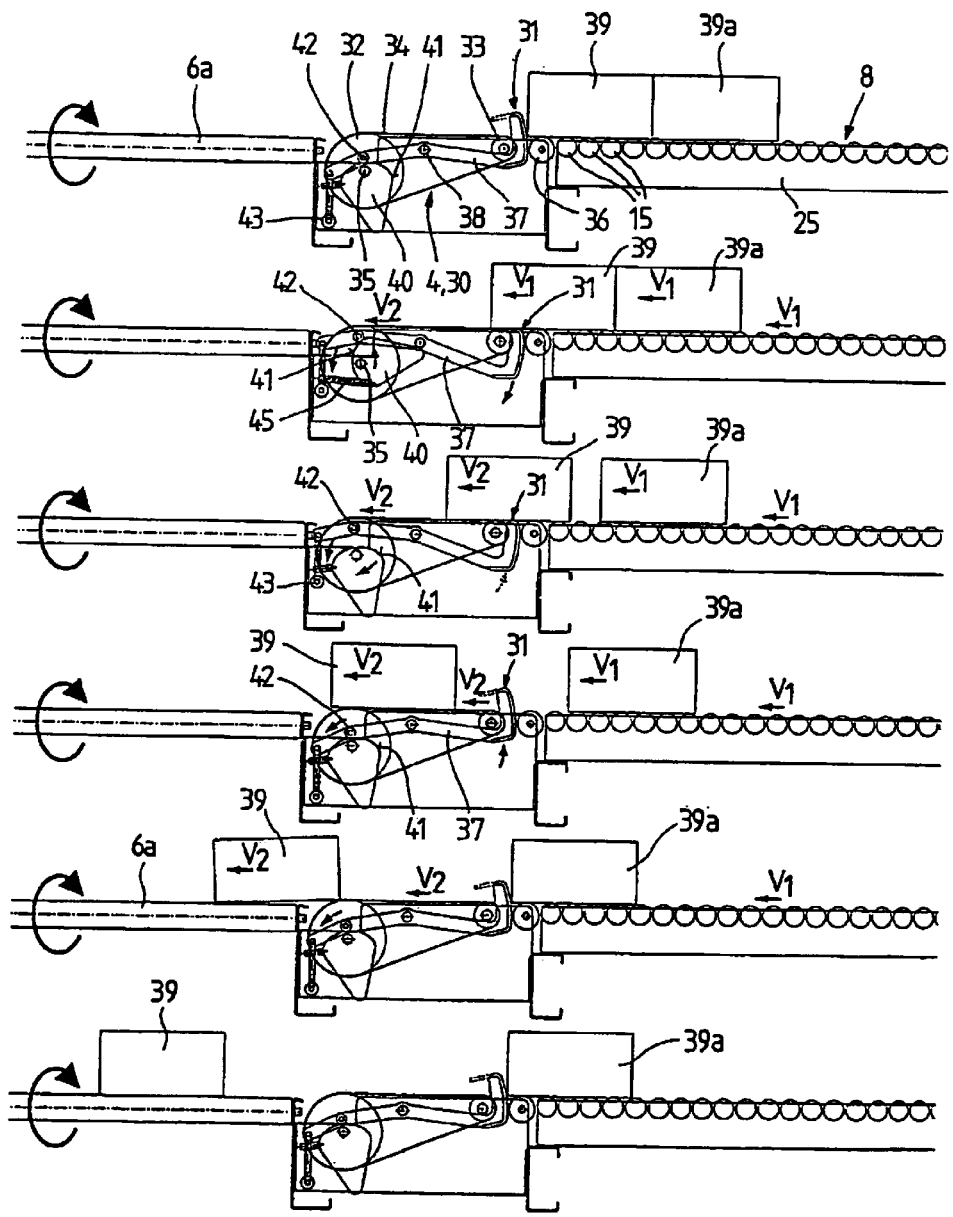

If the cam 40 is rotated approximately 90°, as can be seen in the second stage of FIG. 7 compared to the first stage in the figure, the interaction of the surface 41 with the roller 42 causes the lever 37 to move, the retaining element 31 dropping below the conveying level of the roller conveyor.

At this point in time, the first item 39 is no longer retained by the retaining element 31 and therefore rolls, driven by the roller conveyor, and if necessary by gravity, onto the horizontal conveyor 30. As soon as the bottom side of the first item 39 comes into contact with the belt 34 of the horizontal conveyor 30, the item 39 immediately assumes the speed of the horizontal conveyor 30. Depending on the weight of the item, this speed is at least 25% greater than the speed of the roller conveyor 8. Due to this greater speed on the horizontal conveyor 30, the first item 39 is separated from the subsequent item 39a. FIG. 7 illustrates this with the different speeds $V_2$ and $V_1$, $V_2$ being greater than $V_1$.

In the third stage in accordance with FIG. 7, the item 39, conveyed with its weight virtually exclusively by the horizontal conveyor 30 at its speed, rolls over the retaining element 31. At this point in time, the cam 40 has dropped again due to a time control. In addition, the retaining element 31 remains in its lowered position, since its restoring force is less than the weight of the item 39. The aforesaid restoring force is produced by a counterweight 43 that is suspended on the second arm of the lever 37. The lever 37 of the retaining element cannot pivot upward again due to the counterweight 43 until the bottom side of the item 39 has passed over the retaining element 31, as illustrated in the fourth stage of FIG. 7. The conveyor is immediately blocked again so that the subsequent item 39a is stopped at the retaining element 31. Then the next removal procedure can be initiated, whereby the method repeats. The item 39 conveyed off by the horizontal conveyor 30 travels onto the transport cylinders 6a of the continuously driven transport conveyor 5.

The cam 40 is driven by the continuous rotation of the drive shaft 35. Seated on the drive shaft 35 is an electrical magnetic coupling 44, the drive member of which is the cam 40. Thus it is only during the time-delimited excitation of the magnetic coupling 44 that the cam 40 is actuated and the retaining element 31 thus unblocks. The drive force to be applied for this is relatively low, which is why a small magnetic coupling on the drive shaft 35 is sufficient for driving the cam 40. A tension spring 45 draws the cam 40 back to its rest position.

The details and functioning of the transverse conveyor 11 in the loading facility 2 of the out-processing facility are explained in the following using FIG. 8. Located in front of each passage is a discrete transverse conveyor 11. The transverse conveyor 11 works, as was explained in the foregoing for the out-processing area, using a continuous belt 46 that is guided over belt pulleys 47, 48. Belt 46 and belt pulleys 47, 48 are provided with mutually engaging teeth for preventing slip. A chain can also be employed instead of the belt 46, and pinions instead of the belt pulleys 47, 48.

The carrying or upper run 49 of the belt 46 is located somewhat lower than the top side of the transport cylinders 6a. Belt 46 and belt pulleys 47, 48 are relatively narrow so that they fit between two successive transport cylinders 6a in the transport conveyor 6. Arranged on the exterior side of each continuous belt 46 are catch elements 50 that can circulate together with the belt 46. When they are on the carrying run of the drive belt 46, the catch or pick-up elements 50 project higher than the conveying surface 51 of the transport conveyor 6.

Figure 8:
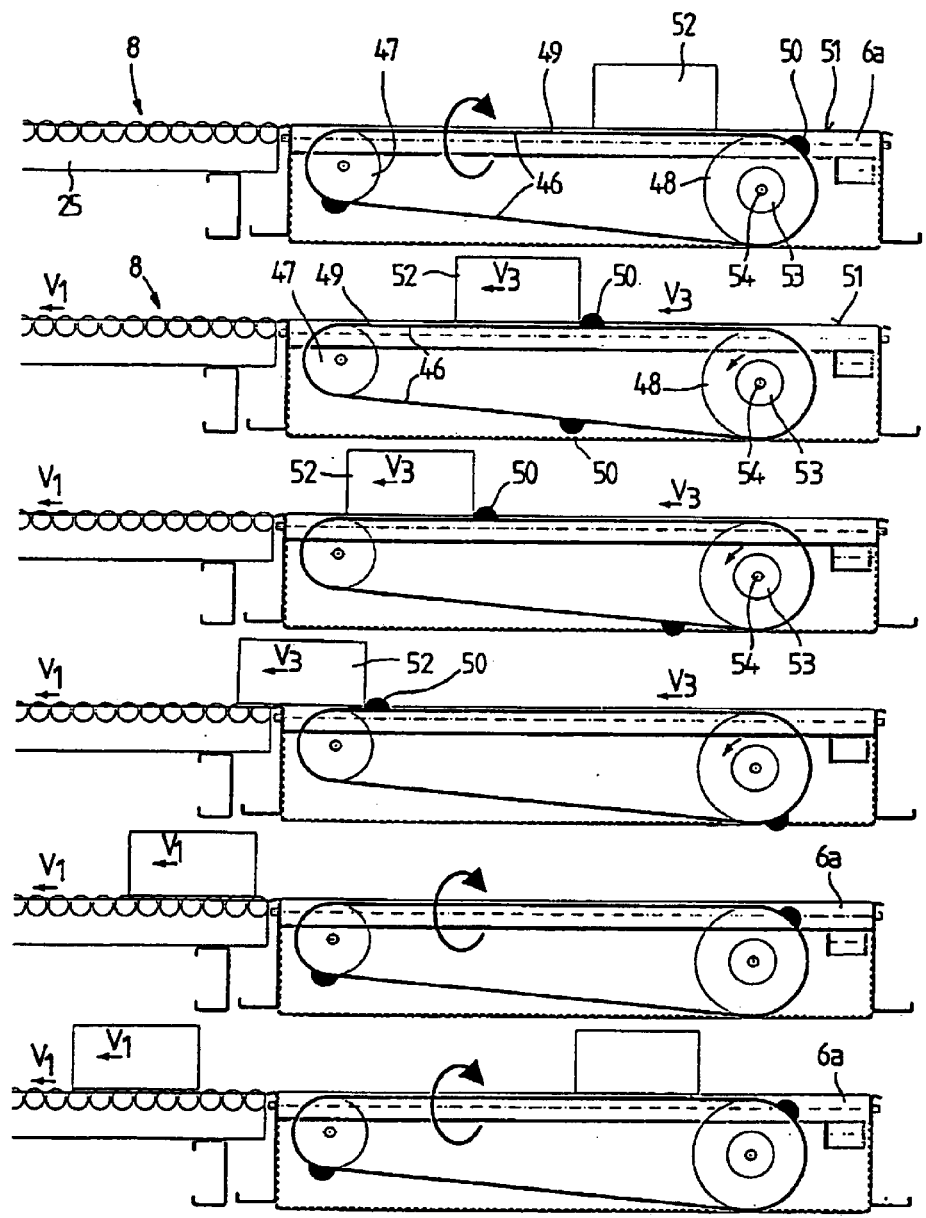

As can be seen in the uppermost illustration in FIG. 8, the interval between pick-up elements 50 is somewhat greater than the length of the carrying run 49. In this manner, neither of the two pick-up elements 50 projects over the conveying surface 51, and thus into the conveying path of the transport conveyor, in the uppermost stage illustrated in FIG. 8. It is not until the transverse conveyor 11 has been turned on that the exterior of the two pick-up elements 50 moves up and grips the item 52 so that it is pushed along the transport rollers 6a into the passage 7. A total of two pick-up elements 50 are provided in the exemplary embodiment, but their number can also be lower or higher, depending on the width of the transport conveyor 6.

The transport belts 46 of the transverse conveyor 11 are also driven using magnetic couplings 53. The magnetic couplings 53 are seated on a main drive shaft 54 that is common to all of the transverse conveyors 11 and that can be controlled separately for each passage. When current is flowing, the magnetic couplings 53 produce a momentary connection between the belt pulley 48 and the main drive shaft 54, the drive belt 46 thus being caused to operate for as long as current flows in the magnetic coupling 53.

Figure 2:
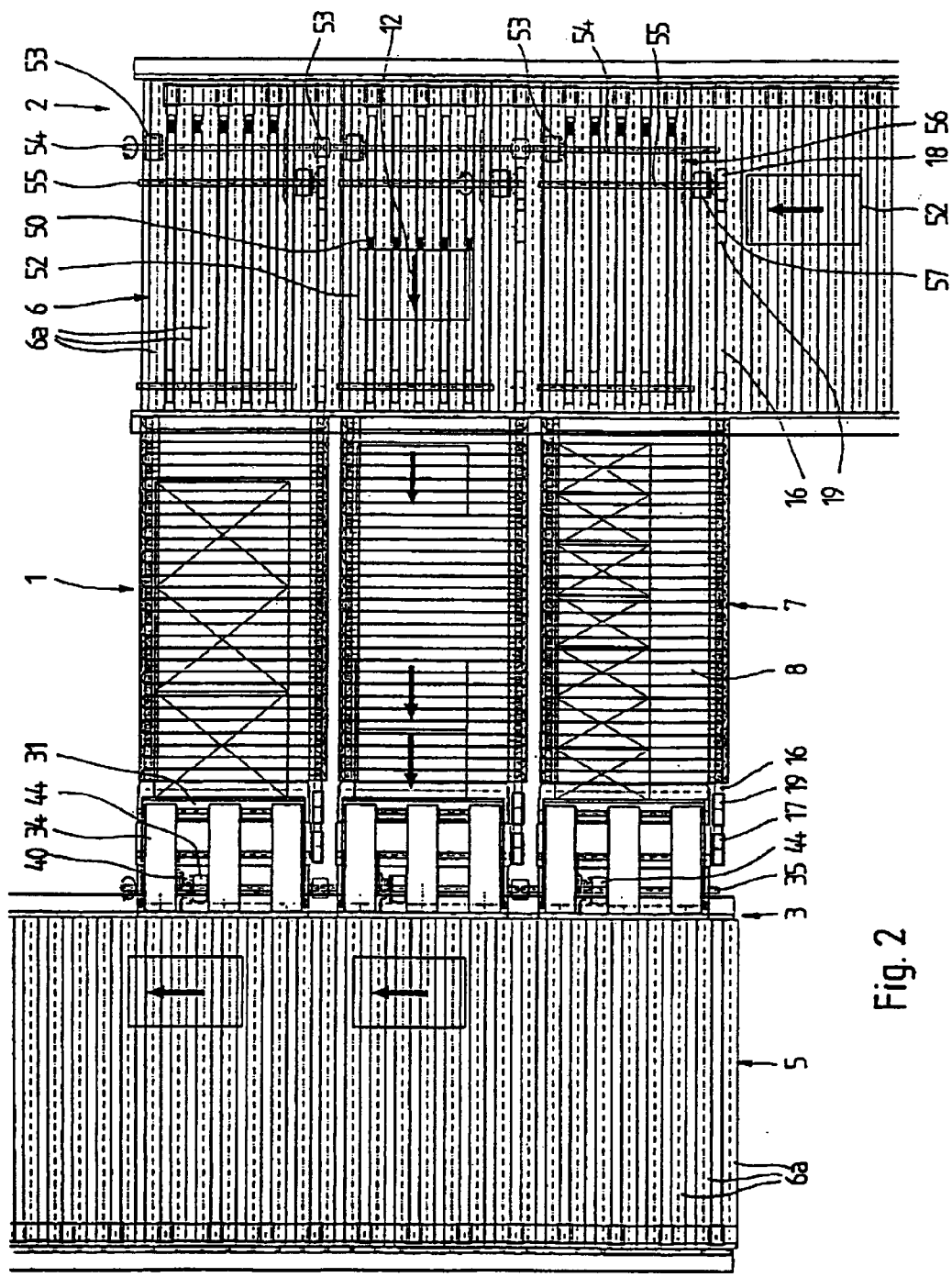

As can be seen in particular from FIG. 2, the main drive shaft 54 causes not only all of the transverse conveyors 11 to move, but it also drives the roller conveyor 8. An additional shaft 55 extends parallel to the main drive shaft 54, whereby the additional shaft 55 is driven by means of a reversing gear 56 by the main drive shaft 54. The reversing gear 56 comprises two opposing toothed wheels that are seated on the main drive shaft 54 or shaft 55 secure against torque. The reversing roller 18 is seated on the shaft 55 via an additional magnetic coupling 57 and is the drive roller for the drive belt 16. Thus, while the shaft 55 runs continuously driven by the main drive shaft 54, torque is only transferred to the reversing roller 18 when the magnetic coupling 57 is actuated. In this manner it is possible, controlled by the magnetic coupling 57, to drive the roller conveyor 8 only as needed. This is the case when new items are to be in-loaded into the passages in the loading area 2, or when an item is to be removed from this passage in the out-processing area. Otherwise the roller conveyor for this passage can rest due to the non-actuation of the magnetic coupling 57, so that the item there is not subjected to unnecessary friction.

Finally, as can be seen from FIG. 2, each transverse conveyor 11 constitutes a plurality of transport belts 46, four transport belts each in the exemplary embodiment. This achieves better and quieter transverse transport of the items 52 into the passages. The transport cylinders 6a of the transport conveyor 6 stand still during this transverse transport.

Figure 9:
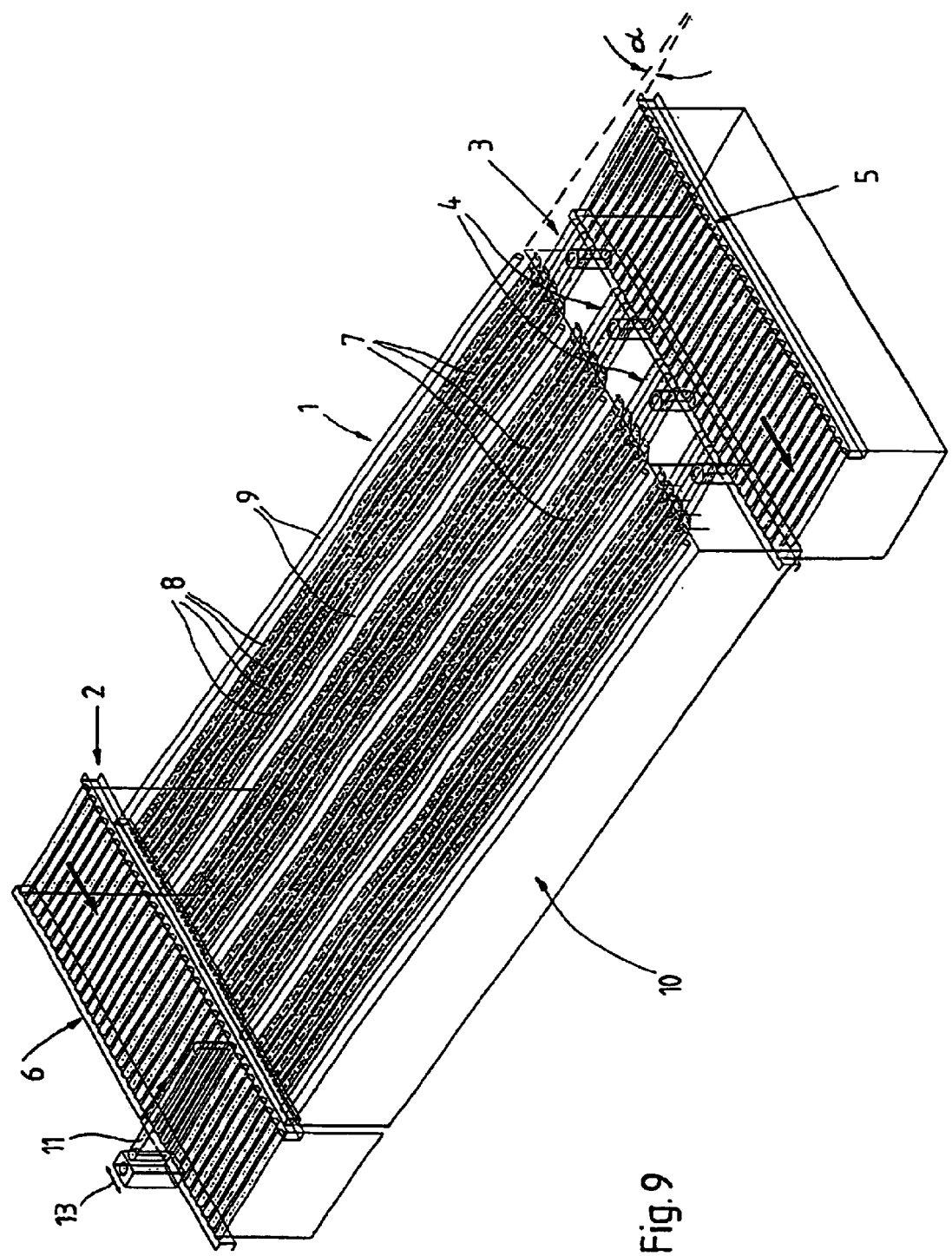

FIG. 9 illustrates an overview of a second embodiment of the out-processing facility. Deviating from the embodiment in accordance with FIGS. 1 through 8, provided in the loading area 2 is a transverse conveyor 11 that is common for a plurality of storage passages 7 and that can be positioned along the transport conveyor 6 in a position in front of each of the storage passages 7.

Figure 10:
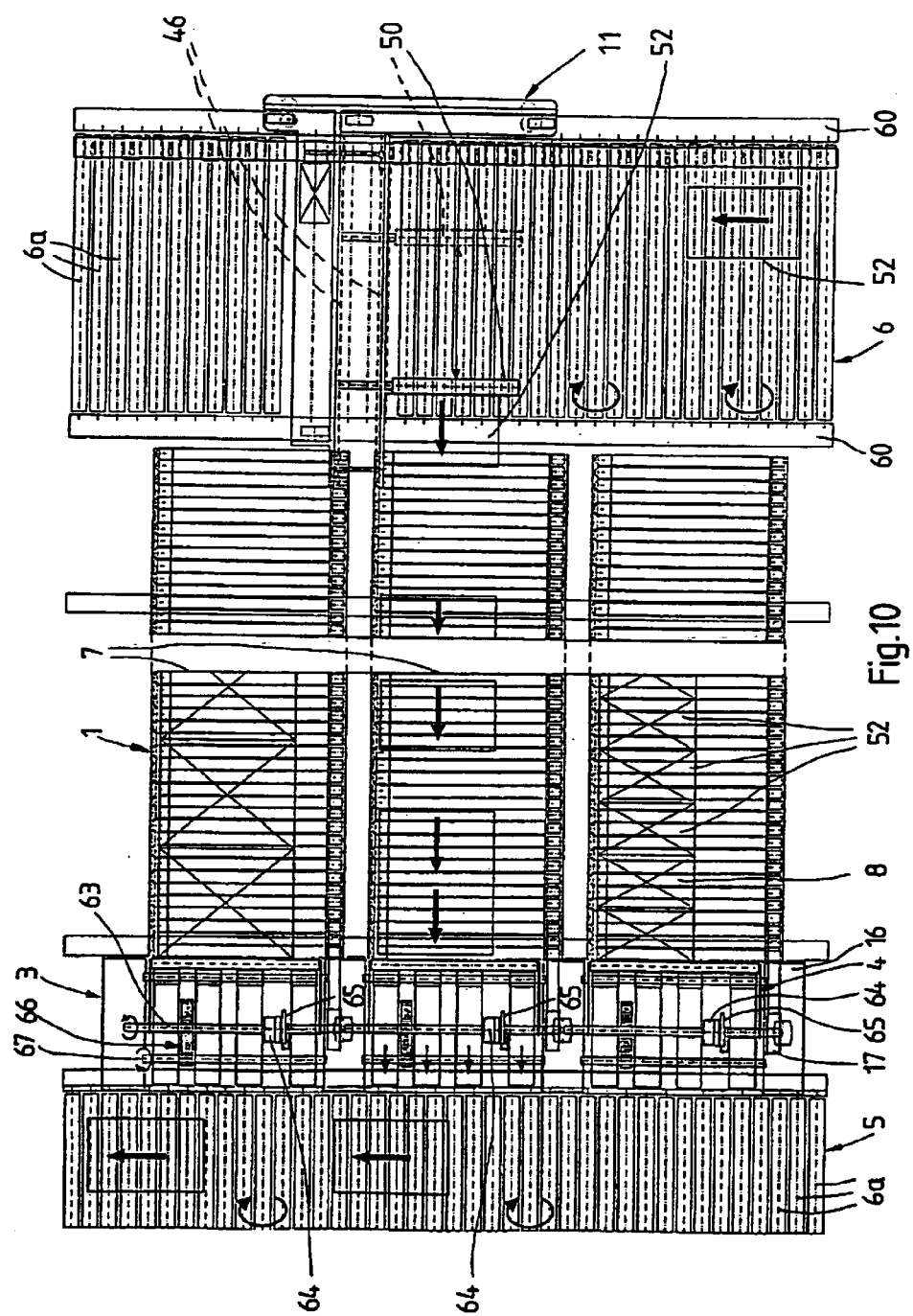

From the top view in FIG. 10 it can be seen that extending along both longitudinal sides of the transport conveyor 6 are rails 60 on which the transverse conveyor 11 can be moved, for which purpose the transverse conveyor has a suitable drive.

In addition, as can be seen in FIG. 17, the transverse conveyor comprises a continuous belt 46 or a corresponding continuous chain. Belt 46 or chain are guided via belt pulleys 47, 48, so that a carrying or upper run 61 and a bottom run 62 result. Affixed to the belt or chain are the two pick-up elements 50, which, as soon as they are at the height of the bottom run 62 of the drive belt 46, project directly over the conveying surface 51 of the transport conveyor 6. If the transverse conveyor 11 is turned on, this leads to the belt 46 or chain being driven, whereby, as soon as it reaches the height of the bottom run 62, whichever pick-up element 50 is next acquires the item 52 located there, whereby it is pushed along the transport cylinders 6a into the storage passage 7. Provided in the exemplary embodiment are a total of two pick-up elements 50; however, their number can also be lower or higher, depending on the width of the transport conveyor 6. If only two pick-up elements 50 are used, during idle periods they are located in the positions indicated in FIG. 17, that is, the pick-up element 50 that will acquire the next item 52 is already situated on the bottom run 62 and thus is in a waiting position at the same height as the item.

As can also be seen from FIG. 10, the pick-up elements 50 are longitudinally-extended, horizontal cylinders with the axis of rotation perpendicular to the direction of motion.

In the out-processing facility in accordance with FIGS. 9 through 17, the roller conveyors 8 are driven by means of a main drive shaft 63 that is situated in the out-processing area 3. This main drive shaft 63 is uniform for one entire module 10 of the out-processing facility. In accordance with FIG. 9, the module 10 comprises a total of four storage passages. However, one module can also be formed from six or eight storage passages, which then have a discrete drive source for the main drive shaft 63. This drive source is turned on as soon as items need to be conveyed in one of the storage passages of the affected module 10, regardless of whether this conveying is along one of the roller conveyors 8 or is removal conveying by means of one of the removal apparatus 4 in the module.

For every storage passage 7 the main drive shaft 63 is provided with a reversing roller 17 that is fixedly joined to the main drive shaft 63. The drive belt 16 for the rollers or cylinders of the roller conveyor 8 is guided via the reversing roller 17. Furthermore, sitting on the main drive shaft 63 for each storage passage is a discrete coupling 64 that also annularly encloses the main drive shaft 63 just as the magnetic couplings described in the fore going. The couplings 64 can be actuated electrically and when current is flowing drive a cam 65, 40, the details of which will be described in greater detail in the following.

The main drive shaft 63 is joined via a greatly stepped up spur gear 66 to a parallel shaft 67 that is separate for each storage passage and that drives the horizontal conveyor 30 of the removal apparatus.

In the exemplary embodiment described herein, therefore, both the roller conveyor and the removal apparatus are driven directly or indirectly by the main drive shaft 63.

Again, the drive for the roller conveyor is not the only transport mechanism for the items conveyed along the roller conveyor. In accordance with FIG. 11, the roller conveyor 8 is also inclined at an angle $\alpha$ with respect to the horizontal so that the items situated on the roller conveyor are also conveyed along the roller conveyor by gravity. The angle of inclination $\alpha$ is relatively small and is preferably only 4%.

Figure 11:
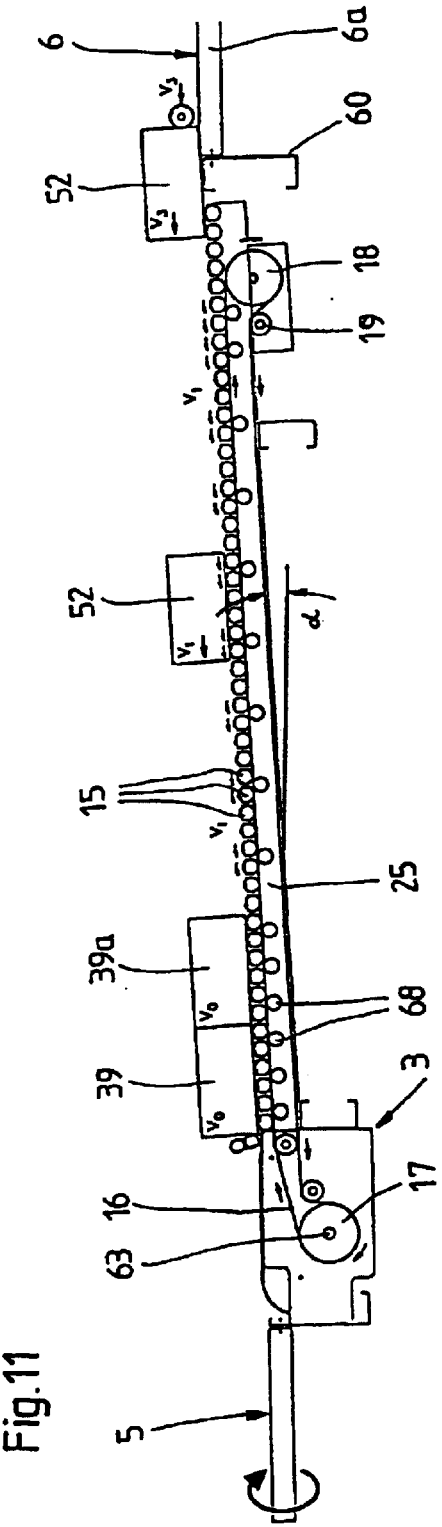

In accordance with FIG. 11, the individual rollers or cylinders 15 for the roller conveyor 8 are driven via the continuous belt 16 that is guided at one end via the reversing roller 17 and at the other via the reversing roller 18. Only the reversing roller 17 is driven, since it is fixedly seated on the main drive shaft 63, whereas the reversing roller 18 runs free and its only function is to reverse. The roller 19 in front of the roller 18 permits the drive belt tension to be adjusted.

Figure 12:
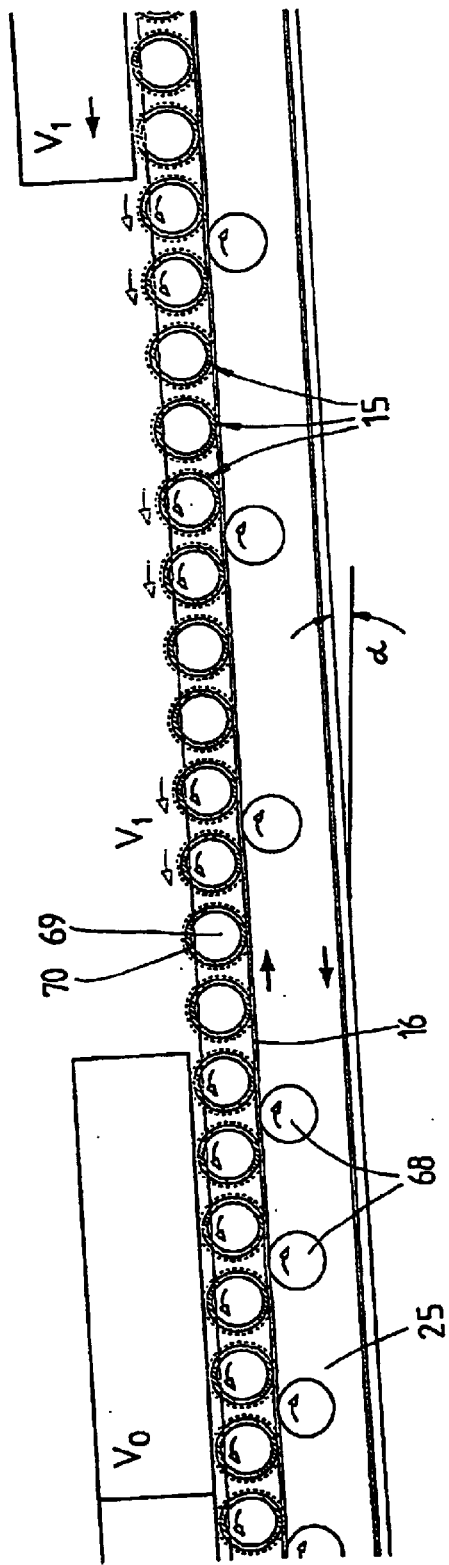

Details of how the individual cylinders 15 are driven will be explained in the following using FIGS. 12 through 14. The drive belt 16 comprises a flat, preferably rubberized belt that is guided between the cylinders 15 and counterpressure rollers 68. The counterpressure rollers 68 constitute the pressure support. One counterpressure roller 68 is on two to four cylinders 15.

FIG. 14 illustrates that the ends of the rollers 15 that are driven by means of the drive belt 16 are provided with a pin 69 that preferably has a smaller diameter than the cylinder body itself. Sitting on the pin 69 that is arranged coaxially with the cylinder body is a sleeve 70 against the outer surface 71 of which the top side of the drive belt 16 is frictionally engaged. Pin 69 and sleeve 70 are preferably cylindrical. What is essential is that there is only a little friction between the exterior side of the pin 69 and the interior surface of the sleeve 70, which can be achieved for instance by pairing suitable materials. Easy to move on plastics are particularly suitable. Furthermore essential is that the coefficient of friction between pin 69 and sleeve 70 is less than the coefficient of friction between sleeve 70 and the top side of the drive belt 16.

In that the drive belt 16 does not act directly upon the cylinders 15, but rather only indirectly via elements that are embodied as sleeves 70 in the exemplary embodiment, the cylinder 15 is driven very softly. As soon as the cylinder 15 is braked, for instance due to the weight of the item container thereupon, this leads to a relative motion between pin 69 and sleeve 70, that is, the pin 69 that is securely joined to the cylinder is at rest, while the sleeve 70, driven by the drive belt 16, continues to turn. As a result, the cylinders are driven by means of a slip that self-adjusts automatically whenever the resistance of the cylinders becomes too high. This latter is always the case when the items located on the roller conveyor back up at the retaining element 31 of the removal apparatus 4. This back-up therefore does not lead to an increased load on the drive of the roller conveyor, but rather the drive forces remain very low due to the slip that self-adjusts automatically at the cylinders 15.

In fact, use of the sleeves 70 has a two-fold effect: not only are the cylinders 15 driven very softly in order for instance to make it possible to transport light-weight item containers with no problem, but another effect is that the cylinders 15 are braked. This effect is achieved with items that are particularly heavy. As a result of the inclination of the roller conveyor 8, due to their high weight they tend to achieve speeds that are too high on the roller conveyor. In this case the more slowly driven cylinders 15 act as braking bodies, whereby the relative speed itself is compensated by the slip that self-adjusts between the cylinders 15 and the sleeves 70 and that works with metered friction. The combination of the slightly inclined roller conveyor 8 and the sleeves 70 operating under slip therefore brakes items that are of above-average weight and actively transports items that are of below-average weight. Overall there is therefore averaging; both light and heavy items, as well as large and small containers, are transported at essentially the same speed along the storage passages.

Figure 15:
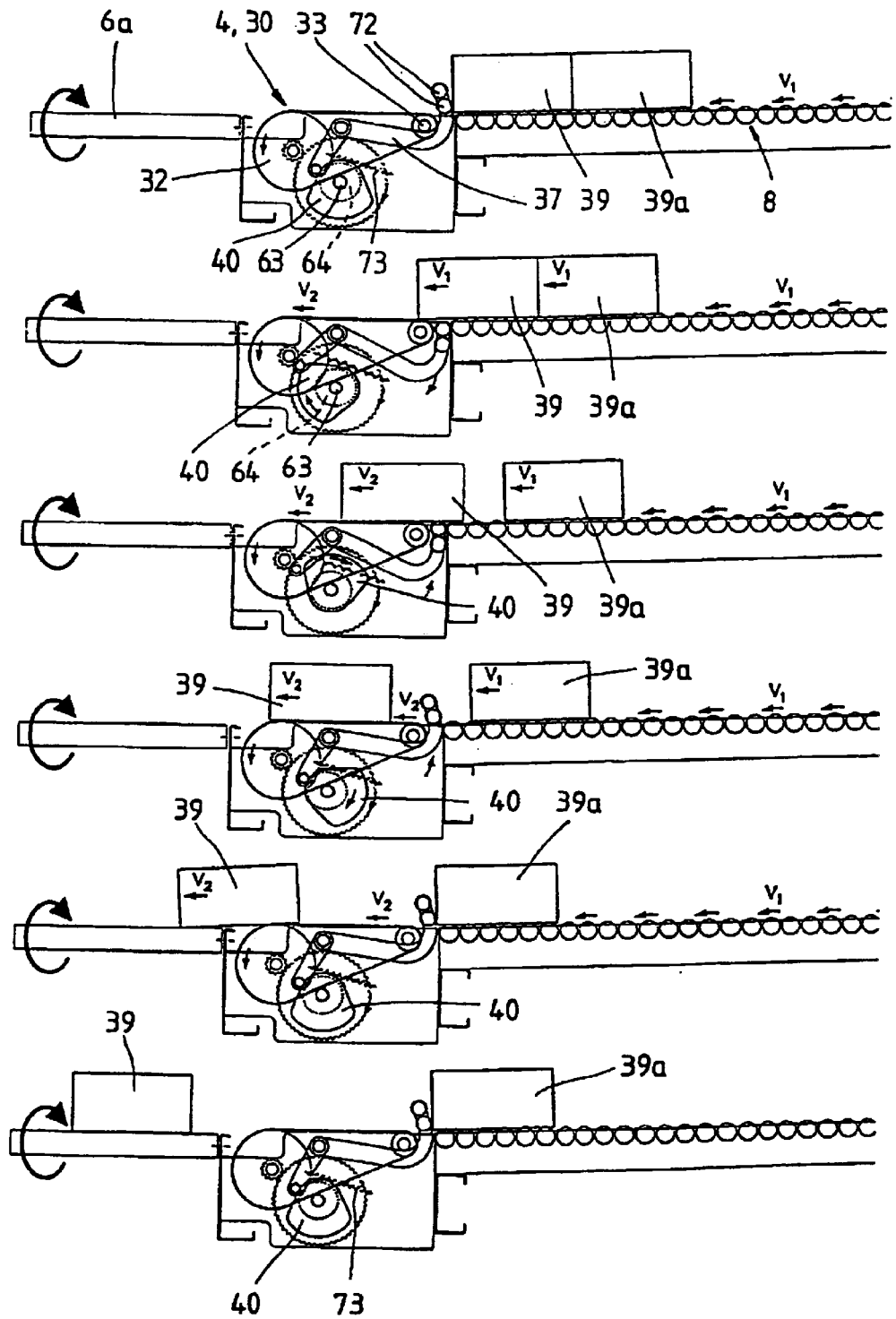
Figure 16A:
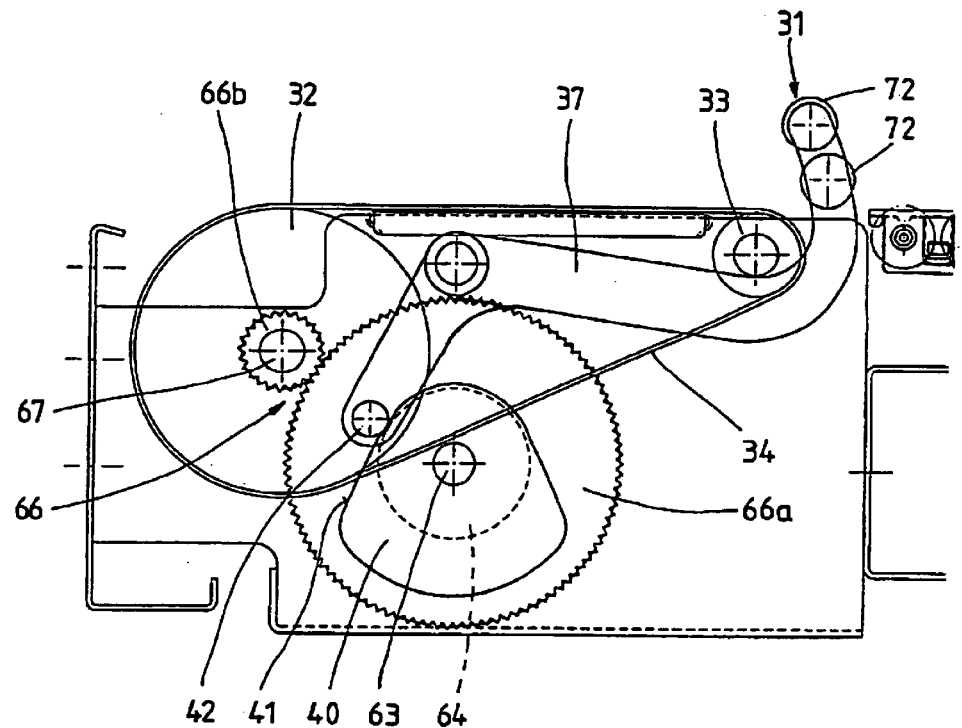
FIG. 16a is an enlargement of a section of the first partial illustration in FIG. 15.
Figure 16B:
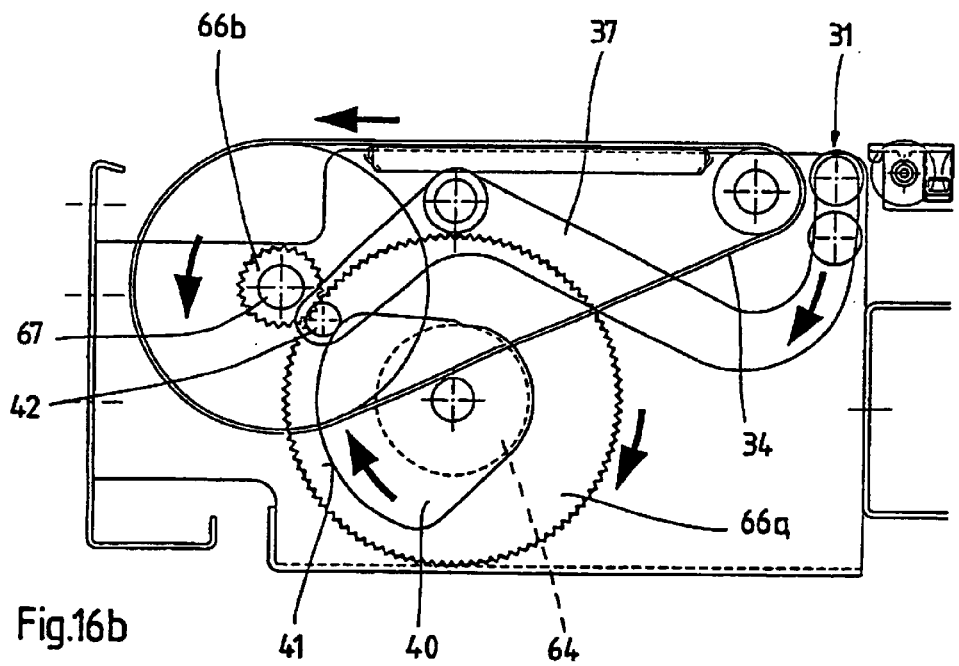
FIG. 16b is an enlargement of a section of the second partial illustration in FIG. 15; and, FIG. 17 is a side view of details of a transverse conveyor arranged in the loading area of the out-processing facility.

The structure and functioning of the removal apparatus 4 illustrated in FIGS. 15, 16a, and 16b largely correspond to the function and manner in which the embodiment in FIG. 7 works. The design of the retaining element 31 is different. It comprises two freely rotatable cylinders 72 arranged one above the other. The advantage of these cylinders instead of a simple plate is the lower frictional resistance when the lever 37 is drawn downward. In addition, as can be seen from the third illustration in FIG. 15, the item 39 that has just been released runs over the cylinder 72 with a lower resistance than over a rigid plate, as in the embodiment in accordance with FIG. 7.

The cam 40 is provided for transitioning the retaining element 31 from its blocking position illustrated in FIG. 16a to its unblocking position illustrated in FIG. 16b. It has the cam surface 41 that runs on the roller 42 of the two-armed lever 37.

If the cam is rotated approx. 75° in accordance with FIGS. 16a and 16b, the interaction of the surface 41 with the roller 42 of the two-armed lever 37 thus causes the lever 37 to move, the retaining element 31, that is, its cylinders 72 acting as blocking element, dropping below the conveying level of the roller conveyor. The first item 39 rolls, driven by the roller conveyor and if necessary by gravity, onto the horizontal conveyor 30. As soon as the bottom side of the first item 39 comes into contact with the belt 34 of the horizontal conveyor 30, the item 39 immediately assumes the speed of the horizontal conveyor 30, which, depending on the weight of the item, is at least 25% higher than the speed of the roller conveyor 8.

Even after the cam 40 re-releases the lever 37, the retaining element 31 remains in its lowered position since its restoring force is less than the weight of the item 39. The restoring force is produced by a tension spring 73 that is suspended on the second arm of the lever 37.

When an item is removed by means of the removal apparatus the cam 40 performs one complete revolution, that is one 360° revolution. It is driven by the continuous rotational motion of the main drive shaft 63. The electrically-actuated coupling 64 mentioned in the foregoing is used for this. The coupling 64 can be a frictional coupling, a claw coupling, or a coupling that operates magnetically.

The driven belt pulley 32 of the horizontal conveyor is seated on the shaft 67 extending parallel to the main drive shaft 63. Guided thereover as well as over the belt pulley 33 is the wide belt 34, the exterior side of which is also the conveying surface for the removal apparatus. As can be seen from FIG. 10, a total of four such belts 34 are used in each removal apparatus in order to form an even surface for the items to be removed. As already described, the non-positive fit between the main drive shaft 63 and the shaft 67 is formed via the greatly stepped up spur gear 66 with the toothed wheels 66a on the main drive shaft 63 and 66b on the shaft 67.

It is obvious that the out-processing facility described in detail in the foregoing is program-controlled. Despite its complexity, the expense for the controls is relatively low since the great majority of processes can be controlled by turning on and off the couplings, which require practically no maintenance.

The specification incorporates by reference the disclosure of German priority document 100 20 608.5 filed 27 Apr. 2000 and International priority documents PCT/EP00/04801 filed 26 May 2000 and PCT/EP99/08823 filed 17 Nov. 1999.

The present invention is, of course, in no way restricted to the specific disclosure of the specification and drawings, but also encompasses any modifications within the scope of the appended claims.

| Legend | |
|---|---|
| 1 | Storage area |
| 2 | Loading area |
| 3 | Out-processing area |
| 4 | Removal apparatus |
| 5 | Transport conveyor |
| 6 | Transport conveyor |
| 6a | Transport cylinder |

-continued

| | Legend |
|---|---|
| 7 | Storage passage |
| 8 | Roller conveyor |
| 9 | Limit, flange |
| 10 | Module |
| 11 | Transverse conveyor |
| 12 | Direction of conveyance |
| 13 | Transverse conveyor direction of travel |
| 15 | Cylinder |
| 16 | Drive belt |
| 17 | Reversing roller |
| 18 | Reversing roller |
| 19 | Tension roller |
| 20 | Base body |
| 21 | Drive segment |
| 22 | Opposing teeth |
| 23 | Pressure support |
| 24 | Profile |
| 25 | Roller conveyor profile |
| 26 | Leg |
| 27 | Axis |
| 28 | Clip |
| 29 | Upper side |
| 30 | Horizontal conveyor |
| 31 | Retaining element |
| 32 | Belt pulley |
| 33 | Belt pulley |
| 34 | Belt |
| 35 | Drive shaft |
| 36 | Roller |
| 37 | Lever |
| 38 | Axis |
| 39 | Item to be removed |
| 39a | Subsequent item |
| 40 | Cam |
| 41 | Cam surface |
| 42 | Roller |
| 43 | Counterweight |
| 44 | Magnetic coupling |
| 45 | Tension spring |
| 46 | Transport belt |
| 47 | Belt pulley |
| 48 | Belt pulley |
| 49 | Carrying run |
| 50 | Pick-up element |
| 51 | Conveying surface |
| 52 | Item |
| 53 | Magnetic coupling |
| 54 | Main drive shaft |
| 55 | Shaft |
| 56 | Reversing gear |
| 57 | Magnetic coupling |
| 60 | Rail |
| 61 | Carrying run |
| 62 | Bottom run |
| 63 | Main drive shaft |
| 64 | Coupling |
| 65 | Cam |
| 66 | Spur gear |
| 66a | Toothed wheel |
| 66b | Toothed wheel |
| 67 | Shaft |
| 68 | Counterpressure roller |
| 69 | Pin |
| 70 | sleeve |
| 71 | Outer surface |
| 72 | Cylinder |
| 73 | Tension spring |

What is claimed is:

1. An out-processing facility for piece items, comprising:
a storage area having a plurality of storage passages for items that are to be out-processed, wherein said storage passages extend parallel to one another in said storage area, and wherein each of said storage passages comprises a roller conveyor having rollers or cylinders, wherein the rollers or cylinders of a given storage passage are rotatable via a common drive means;
a loading area disposed at a first end of said storage passages and including means for in-loading items into said storage passages; and
an out-processing area disposed at a second end of said storage passages and including removal apparatus for a computer-controlled transfer of individual items out of said storage passages onto conveyor devices disposed downstream thereof, wherein each storage passage is provided with its own one of said removal apparatus that is actuatable independently of the rest of said removal apparatus, wherein each of said removal apparatus comprises a horizontal conveyor, and wherein said horizontal conveyors associated with a plurality of said storage passages are drivable via a common drive shaft as soon as an item is to be removed out of one of such storage passages via a pertaining removal apparatus.

2. An out-processing facility according to claim 1, wherein in addition to said common drivable removal apparatus, the pertaining storage passages are also drivable via said common drive shaft as soon as items are to be conveyed in one of such storage passages or are to be removed out of such storage passages via said removal apparatus.

3. An out-processing facility according to claim 1, wherein said common drive means is an endless drive belt.

4. An out-processing facility according to claim 3, wherein said drive belt is guided between said rollers or cylinders and a pressure support.

5. An out-processing facility according to claim 3, wherein said drive belt drives an element that is preferably embodied as a sleeve and that is rotatably mounted on said roller or cylinder.

6. An out-processing facility according to claim 5, wherein a coefficient of friction between roller or cylinder and said element is less than a coefficient of friction between said element and said drive belt.

7. An out-processing facility according to claim 3, wherein a reversing of said drive belt is effected via reversing rollers that are disposed in or under at least one of said loading area and said out-processing area.

8. An out-processing facility according to claim 7, wherein a reversing roller is disposed below said out-processing area and is driven.

9. An out-processing facility according to claim 1, wherein movement of said drive means of said roller conveyor is derived from rotational movement of said common drive shaft.

10. An out-processing facility according to claim 1, wherein said roller conveyors are inclined in a direction toward said removal apparatus.

11. An out-processing facility according to claim 10, wherein said angle of inclination is 2.5 to 6%.

12. An out-processing facility according to claim 1, wherein a preferably continuously driven transport conveyor is provided for items removed with the aid of said removal apparatus and extends along said removal apparatus, and wherein each of said removal apparatus, in addition to said horizontal conveyor, includes an actuatable retaining element that projects into a conveying path of said roller conveyor, wherein a conveying speed of said horizontal conveyor is greater than a conveying speed of said roller conveyor.

13. An out-processing facility according to claim 12, wherein said conveying speed of said horizontal conveyor is at least 25% greater than said conveying speed of said roller conveyor.

14. An out-processing facility according to claim 12, wherein a controlled, switchable coupling is provided for a periodically delimited derivation of an unblocking movement, of said retaining element, which movement releases a conveying path, and is derived from a rotational movement of said common drive shaft, and wherein said coupling of each of said removal apparatus is separately controllable from the rest of said couplings.

15. An out-processing facility according to claim 14, wherein said retaining element is provided with restoring means that via a restoring force acts upon said retaining element in a direction of a blocking movement thereof.

16. An out-processing facility according to claim 14, wherein said coupling annularly spans said common drive shaft, and wherein a drive component of said coupling is a cam that upon actuation of said coupling pivots against said retaining element.

17. An out-processing facility according to claim 16, wherein said cam is mounted on an axis that is coaxial to a shaft that drives said horizontal conveyor.

18. An out-processing facility according to claim 12, wherein said horizontal conveyor comprises a driven first belt pulley, at least one further belt pulley that moves therewith, as well as an endless belt that is guided via said belt pulleys, wherein said driven belt pulley defines a front end of said horizontal conveyor, and said second belt pulley defines a rear end of said horizontal conveyor.

19. An out-processing facility according to claim 18, wherein said first belt pulley is seated on a drive shaft that, via an interposed gear, is in a continuous rotational connection with said common drive shaft that drives the plurality of roller conveyors.

20. An out-processing facility according to claim 1, wherein a transport conveyor is provided for items that are to be in-loaded, wherein said transport conveyor extends in said loading area transverse to said storage passages, and wherein a transverse conveyor is provided in said loading area.

21. An out-processing facility according to claim 20, wherein said transverse conveyor is common for a plurality of said storage passages, and wherein said transverse conveyor is adjustable along a transport path into a position upstream of each of said storage passages.

22. An out-processing facility according to claim 21, wherein said transverse conveyor is provided with belt pulleys via which is guided an endless drive belt or a drive chain, and wherein two pick-up elements for items are disposed on said drive belt or said drive chain.

* * * * *